US008117445B2

(12) United States Patent
Werner et al.

(10) Patent No.: US 8,117,445 B2
(45) Date of Patent: *Feb. 14, 2012

(54) NEAR FIELD COMMUNICATION, SECURITY AND NON-VOLATILE MEMORY INTEGRATED SUB-SYSTEM FOR EMBEDDED PORTABLE APPLICATIONS

(75) Inventors: Jeremy Isaac Nathaniel Werner, San Jose, CA (US); Russell Barck, San Jose, CA (US); George Minassian, Cupertino, CA (US)

(73) Assignee: Spansion LLC, Sunnyvale, CA (US)

( * ) Notice: Subject to any disclaimer, the term of this patent is extended or adjusted under 35 U.S.C. 154(b) by 972 days.

This patent is subject to a terminal disclaimer.

(21) Appl. No.: 11/613,620

(22) Filed: Dec. 20, 2006

(65) Prior Publication Data
US 2008/0155257 A1 Jun. 26, 2008

(51) Int. Cl.
*H04L 9/32* (2006.01)
(52) U.S. Cl. ...................................... 713/168
(58) Field of Classification Search ............ 713/168
See application file for complete search history.

(56) References Cited

U.S. PATENT DOCUMENTS

| 5,603,001 | A * | 2/1997 | Sukegawa et al. | 711/103 |
| 2001/0033012 | A1* | 10/2001 | Kommerling et al. | 257/679 |
| 2005/0109841 | A1* | 5/2005 | Ryan et al. | 235/380 |
| 2005/0171898 | A1* | 8/2005 | Bishop et al. | 705/39 |
| 2005/0191968 | A1* | 9/2005 | Tabayashi et al. | 455/74 |
| 2005/0216651 | A1* | 9/2005 | Tanabiki et al. | 711/100 |
| 2006/0101280 | A1* | 5/2006 | Sakai | 713/184 |
| 2006/0240852 | A1* | 10/2006 | Al-Sarawi | 455/466 |
| 2007/0192826 | A1* | 8/2007 | Frank et al. | 726/1 |

* cited by examiner

*Primary Examiner* — Nasser Moazzami
*Assistant Examiner* — Michael S McNally
(74) *Attorney, Agent, or Firm* — Turocy & Watson, LLP

(57) ABSTRACT

An architecture is presented that facilitates integrating memory, security functionalities and near field communication (NFC) capabilities in a mobile device. A memory module is provided that comprises non-volatile memory that stores security software, sensitive data, and keys and a security processor that accesses the security software from the non-volatile memory and performs security functions based on the security software stored. A NFC radio frequency transmitter and receiver (RF) is directly integrated into the security processor to facilitate NFC capabilities within the secure environment of the memory module. Further, the non-volatile memory directly interfaces to an NFC antenna positioned outside of the memory module via the integrated NFC RF. The integration of the security processor, memory, and NFC RF into the memory module provides a trusted environment for the manipulation and decryption of data received through the NFC antenna.

18 Claims, 12 Drawing Sheets

NEAR FIELD COMMUNICATION, SECURITY AND NON-VOLATILE MEMORY INTEGRATED SUB-SYSTEM FOR EMBEDDED PORTABLE APPLICATIONS

BACKGROUND

Robust security is imperative for network-based systems, particularly for applications that deal with sensitive information, to prevent unauthorized agents from intercepting, corrupting or publishing sensitive data. A suitable information security system must perform with minimum disruption to users to ensure that authorized users are neither erroneously denied access nor unduly restricted in their duties.

Furthermore, near field communication (NFC) technology has become an increasingly popular form of connectivity technology. Operating at 13.56 MHz and transferring data at up to 424 Kbits/second, NFC provides a bi-directional local wireless communication channel. Communication between two NFC-compatible devices occurs when they are brought within four centimeters of one another: a simple wave or touch can establish an NFC connection which can then be used to transfer information and/or keys used to make purchases or gain physical access to an area. Products with built-in NFC technology will dramatically simplify the way consumer devices interact with one another, helping people speed connections, receive and share information and even make fast and secure payments.

However, a problem common to security-based systems and NFC technology is the vulnerability of the security functionality. Compromise of the integrity of the software or the confidentiality of the data used by an NFC transceiver can result in system failures or worse abuses such as fraud. This is a major concern, since attackers using sophisticated techniques have compromised a wide variety of existing systems, resulting in the intercepting, corrupting or publishing of sensitive data. Therefore, there is a continuing need to include adequate security mechanisms to protect such systems and the NFC technology. Another common problem with NFC chipsets is the limited availability of secure memory which directly results in limited functionality or compromised security.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a memory module that facilitates integrated security capabilities and NFC communications capabilities. The memory module comprises non-volatile memory that stores security software, keys, and sensitive data, and a security processor that accesses the security software from the nonvolatile memory and performs security functions based on the security software stored. Furthermore, a near field communication (NFC) radio frequency (RF) is directly integrated into the security processor in one integrated circuit to facilitate NFC functionality within the secure environment of the memory module. Thus, NFC wireless protocol capabilities and security functionalities are tightly coupled together and executed within the secure execution environment. Integration of the NFC RF in the security processor allows content to be transferred in and out of the non-volatile memory, directly via an interface to an NFC antenna positioned outside of the memory module to enable the wireless transfer of information.

In another implementation of the claimed subject matter, the NFC RF is a separate integrated circuit (IC) located within the memory module. Positioning the NFC RF within the memory module allows NFC functionality within the secure execution environment. NFC wireless protocol capabilities and security capabilities are then executed within the secure execution environment of the memory module. Further, positioning of the NFC RF within the memory module also enables the secure non-volatile memory to directly communicate with the NFC RF chip via the security processor. The NFC RF chip then directly interfaces to an NFC antenna positioned outside of the memory module to enable the wireless communication with the reader/external terminal In another implementation of the claimed subject matter, the NFC RF is a separate integrated circuit located outside of the memory module. The NFC RF directly communicates with the security processor and non-volatile memory via a dedicated bus between the security processor and the RF integrated circuit. The dedicated bus allows NFC wireless protocol capabilities and security capabilities to be executed within the secure execution environment of the memory module. Further, the NFC RF directly interfaces to an NFC antenna positioned outside of the memory module to further enable wireless communication with the reader/external terminal.

In another implementation of the claimed subject matter, the NFC RF, security processor and non-volatile memory are all implemented on a single integrated circuit. This implementation on a single integrated circuit further reduces the threats from attackers to the trusted execution environment. Further, the NFC RF directly interfaces to an NFC antenna positioned outside of the memory module to further enable successful wireless communications with the reader/external terminal.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
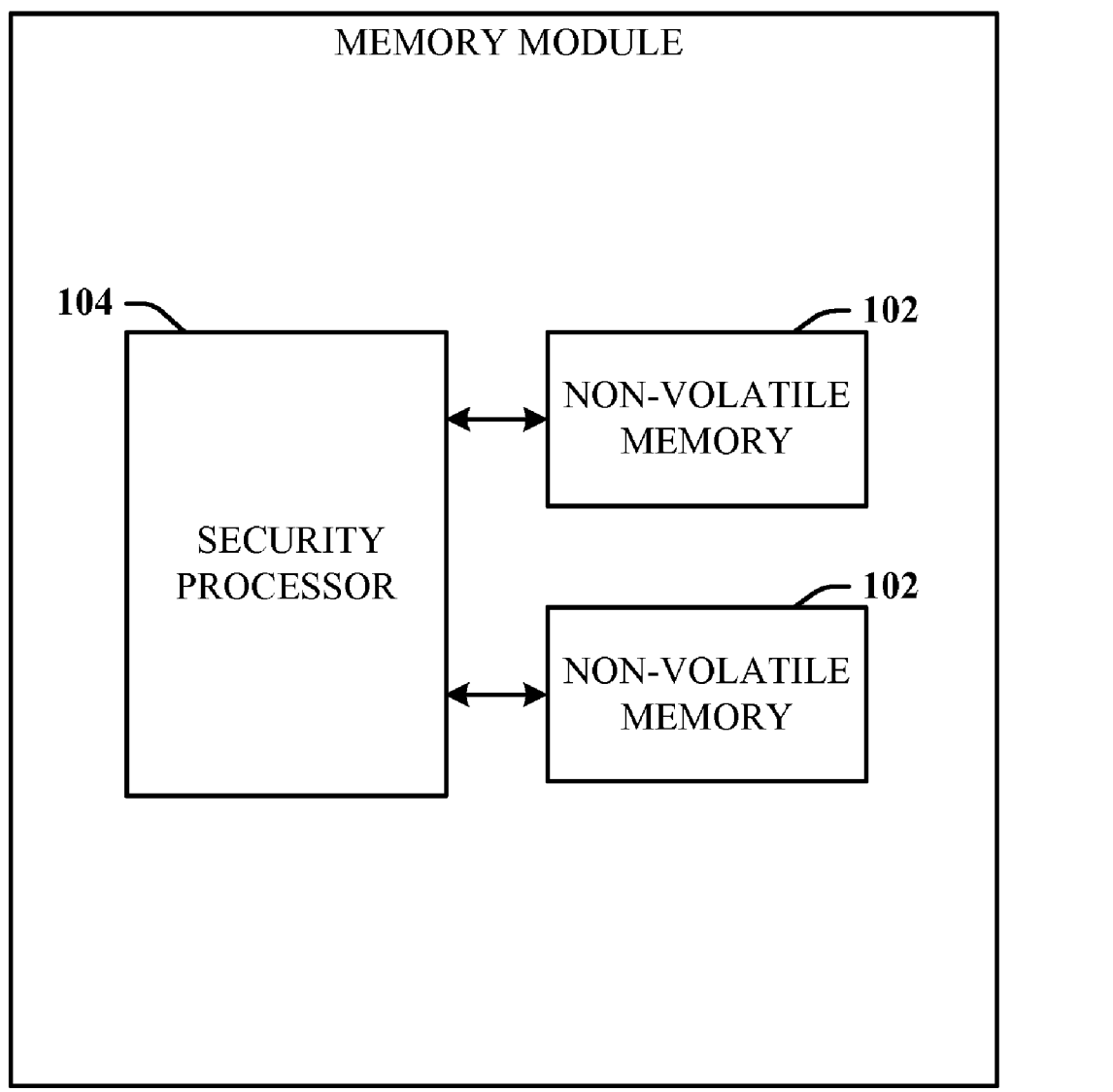
FIG. 1 illustrates a block diagram of a memory module.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Security is imperative for network-based systems, particularly for applications that deal with sensitive information, to prevent unauthorized agents, in the form of hardware and/or software, from intercepting, corrupting or publishing sensitive data. As stated supra, suitable information security system must perform with minimum disruption to users to ensure that authorized users are neither erroneously denied access nor unduly burdened or restricted in their capabilities. Accordingly, the following subject matter optimizes processor utilization and creates a heightened level of security for NFC applications.

A memory module that facilitates integrated security capabilities and NFC functionality is disclosed. The memory module arbitrates with an external processor located outside of the memory module for access to the non-volatile memory. The security processor provides for concurrent processing of security protocols and NFC functionality while the external processor executes normal functions, alleviating the external processor from having to execute functions associated with security functions. The memory module acting as proxy for the external processor enables a heightened level of security for communications utilizing the NFC communication channel. The memory module is a tamper-resistant and trusted secure environment and its use within the system by the external processor can prevent fraud, abuse, and theft.

Referring initially to the drawings, FIG. 1 illustrates a memory module 100 that facilitates integrated security capabilities in accordance with an innovative aspect. The memory module is a package containing one or multiple chips of integrated circuits or semiconductors, wherein one integrated circuit houses a security processor 104 and another integrated circuit houses non-volatile memory 102. The integrated circuits are then coupled together to form the memory module 100. Optionally, the security processor 104 and the non-volatile memory 102 could be housed on one integrated circuit or piece of silicon. Furthermore, the non-volatile memory 102 of the memory module 100 stores security software for use by the security processor 104. The non-volatile memory 102 is typically flash memory, but can be any type of non-volatile memory typically used for the task of secondary storage, or long-term persistent storage. Furthermore, one or more non-volatile memory 102 can be included in the memory module 100. If more than one non-volatile memory 102 is included, the non-volatile memory 102 is not required to be of the same type and/or density.

The security software includes password access control software, authentication software, shared key authentication software, public key infrastructure (PKI) authentication software, integrity check software, encryption/decryption software, anti-virus software, anti-spyware software, secure communication software, and any other type of security software available. The security software is directly embedded into the non-volatile memory 102 to provide integrated security capabilities within the memory module 100. The security processor 104 accesses the security software from the non-volatile memory 102 and performs security functions based on the specific security software stored. The security processor 104 controls the entire non-volatile memory storage and monitors all traffic to and from the non-volatile memory components 102.

Figure 2:
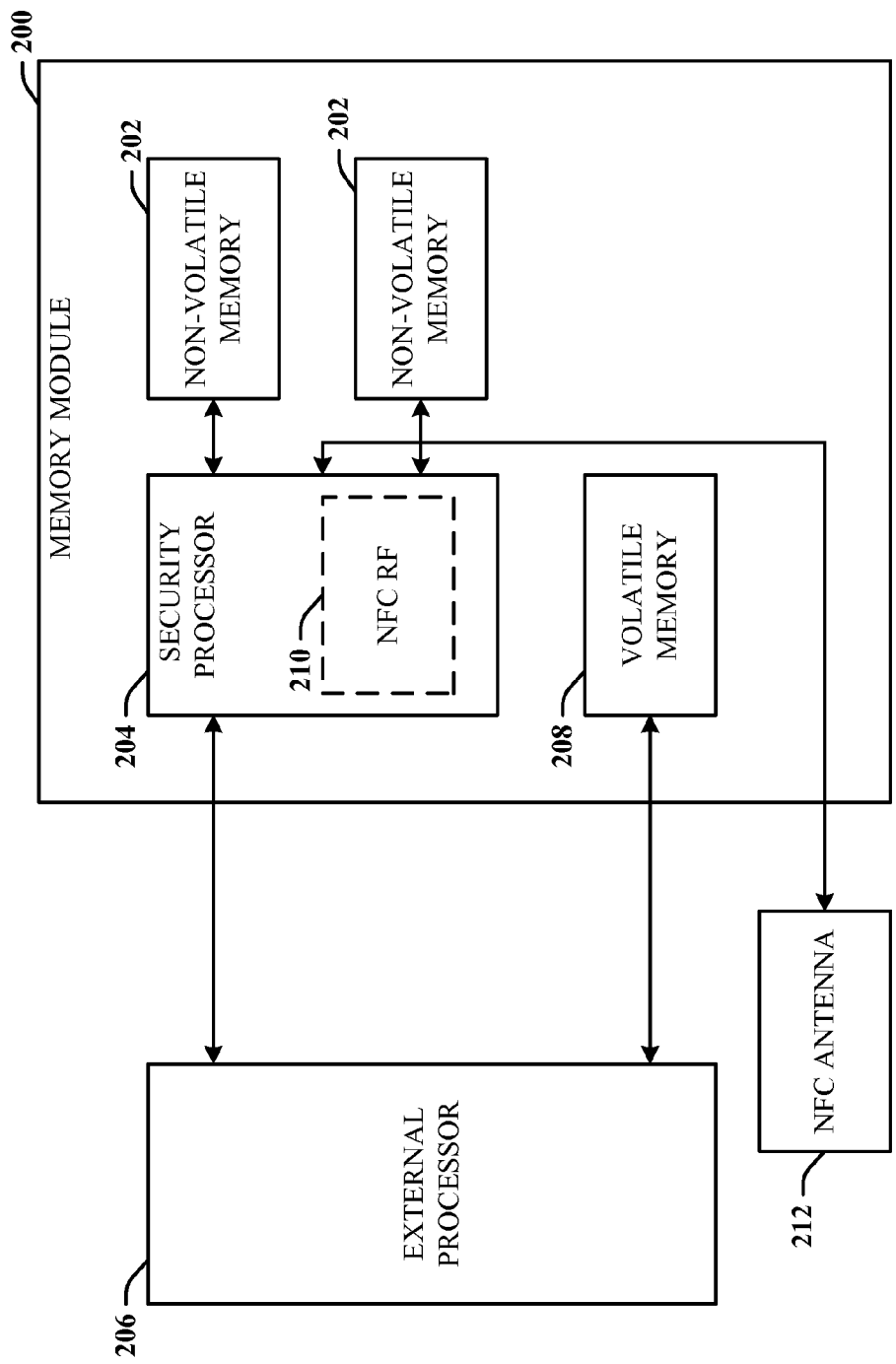
FIG. 2 illustrates a block diagram of the memory module wherein a NFC RF is integrated directly into a security processor.

As illustrated in FIG. 2, the memory module 200 communicates with an outside or external processor 206 via one or more communication busses, to facilitate the integrated security capabilities. The communication bus could be a NOR or NAND bus or both or a single bus which enables a NOR or NAND Interface. If more than one bus is utilized, both can be functioning in parallel. The external processor 206 is a typical applications processor that handles communications and runs applications. The external processor 206 can be a baseband processor or application processor for a mobile handset, personal data assistant (PDA), or the like. As stated supra, the memory module 200 includes non-volatile or flash memory 202 that stores security software and a security processor 204 that accesses the security software and performs security functions based on the specific security software stored. Accordingly, the security processor 204 sits in series between the external processor 206 and the non-volatile memory 202.

Furthermore, a near field communication (NFC) radio frequency transmitter and receiver (RF) 210 is directly integrated into the security processor 204 in one integrated circuit. NFC technology is a short-range wireless connectivity technology that evolved from a combination of existing contactless identification and interconnection technologies. Operating at 13.56 MHz and transferring data at up to 424 Kbits/second, NFC provides a bi-directional local wireless communication channel. Communication between two NFC-compatible devices occurs when they are brought within four centimeters of one another: a simple wave or touch can establish an NFC connection which can then be used to transfer information and/or keys used to make purchases or gain physical access to an area. NFC can be used with a variety of devices, from mobile phones that enable payment or transfer information to digital cameras that send their photos to a television (TV) set with just a touch, it also enables NFC devices, like your mobile phone or PDA, to act as an electronic key to access your home, office, or car, or to pay for—as well as to act as—your transport ticket.

For example, NFC applications include "Touch and Go" applications such as access control or transport/event ticketing, where the user brings the device storing the ticket or access code close to the reader. "Touch and Confirm" applications such as mobile payment where the user has to confirm the interaction by entering a password, swiping a finger across a biometric sensor, or just accepting the transaction. "Touch and Connect" applications such as linking two NFC-enabled devices to enable peer to peer transfer of data such as downloading music, exchanging images or synchronizing address books. And, "Touch and Explore" applications such as exploring a device's capabilities to find out which functionalities and services are offered.

Accordingly, NFC technology provides the secure transfer of your confidential personal data, such as credit card numbers, coupons, membership data or digital rights. And by providing a fast and easy connection between a PC and mobile phone or a TV and PDA, it allows a user to update and align appointments or any other data. For example, NFC allows a user to load the departure times of a bus into a mobile device by simply holding it close to the NFC-enabled timetable, or access the latest film news and reviews at the cinema by walking up to an NFC-enabled poster.

Integrating the NFC RF 210 directly within the integrated circuit of the security processor 204 allows NFC functionality within the secure environment of the memory module 200. It also reduces the cost of implementation, and reduces power consumption and noise within the system. Thus, NFC wireless protocol capabilities and security capabilities such as access controls and secure offloading (i.e., encryption on the fly, checking rights, authenticating a user, authenticating components within the system, channel encryption, etc.) are tightly coupled together and executed within the secure execution environment. Further, integration of the NFC RF 210 directly within the security processor 204 also enables the secure non-volatile memory 202 to directly interface to an NFC antenna 212 positioned outside of the memory module 200 to further enable wireless communication with the reader/external terminal.

Accordingly, the integration and tight coupling of the NFC technology and security capabilities in the memory module 200 enable securely updatable in the field implementations. For example, the integrated solution enables updateable keys and accounts in the field over the air, applies time expiration to the keys and accounts, enables NFC capability within the portable electronics and provides flexible re-allocation of the system memory. Uses for this NFC capability can include, but are not limited to, secured proximity payments, secured proximity payments including terminal based authentication of the user, secure physical access to doors, electronic transfer of physical access keys, local payments, local debit account payments, over the air pre-paid payments, data downloads from billboards and posters, micro-payments to vending machines, ticketing (i.e., trains, buses, and subways), and a radio frequency identification (RFID) inventory reader or writer.

In another implementation, the NFC RF 210, the security processor 204 and the non-volatile memory 202 are all implemented on a single integrated circuit (not shown). This implementation on a single integrated circuit further reduces the threats from attackers to the trusted execution environment. Further, the NFC RF directly interfaces to an NFC antenna positioned outside of the memory module to further enable successful wireless communications with the reader/external terminal.

Furthermore, as shown in FIG. 2, the memory module 200 also includes volatile memory or random access memory (RAM) 208 used for the temporary data and code storage needs of the external processor 206. Accordingly, the security processor 204 can control the entire non-volatile memory storage space and NFC RF 210 and monitors all traffic to and from the non-volatile memory components 202. Further, the security processor 204 provides for concurrent processing of security protocols and NFC capabilities while the external processor 206 executes normal functions. However, processing security protocols does not imply that the data being processed is secure or not secure. Allowing the security processor 204 to control the security functionality of the non-volatile memory 202, alleviates the external processor 206 from having to execute functions associated with security such as authentication, encryption, and signing. Accordingly, both the security processor 204 and the external processor 206 coordinate read/write access to the non-volatile memory 202 so as to optimize processor/memory utilization while ensuring a heightened level of security for NFC technology. But, as mentioned previously, the security processor 204 monitors all traffic between the external processor 206 and the non-volatile memory 202 and with its integrated access control mechanisms can prevent unauthorized access to the non-volatile memory 202 from the external processor 206.

Figure 3:
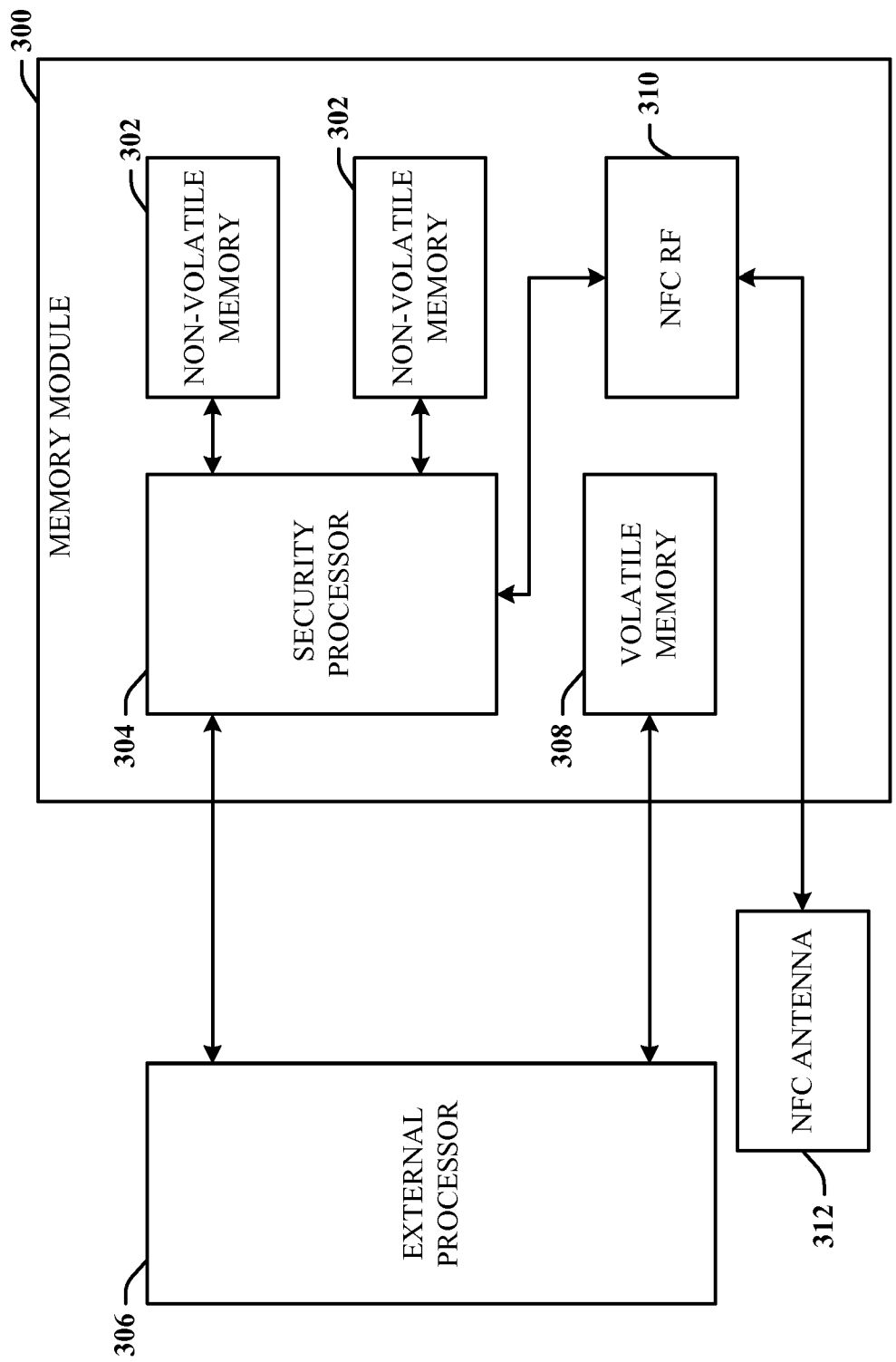
FIG. 3 illustrates a block diagram of the memory module wherein the NFC RF is a separate IC located within the memory module.

In another embodiment as illustrated in FIG. 3, an NFC RF 310 is a separate integrated circuit located within the memory module 300. Positioning the NFC RF 310 within the memory module 300 allows NFC functionality within the secure execution environment. It also reduces the cost of implementation, and reduces power consumption and noise within the system. As stated supra, NFC wireless protocol capabilities and security capabilities such as access controls and secure offloading (i.e., encryption on the fly, checking rights, authenticating a user, authenticating components within the system, channel encryption, etc.) are tightly coupled together and executed within the secure execution environment of the memory module 300. Further, positioning of the NFC RF 310 within the memory module 300 also enables the secure non-volatile memory 302 to directly communicate with the NFC RF chip 310 via the security processor 304. The NFC RF chip 310 then directly interfaces to an NFC antenna 312 positioned outside of the memory module 300 to further enable wireless communication with the reader/external terminal.

The security processor 304 communicates with an external processor 306, such that the security processor 304 provides for concurrent processing of security protocols and NFC communications while the external processor 306 executes normal functions and WAN or LAN communications. Furthermore, the memory module 300 also includes volatile memory or RAM 308 used for the temporary data and code storage needs of the external processor 306.

Figure 4:
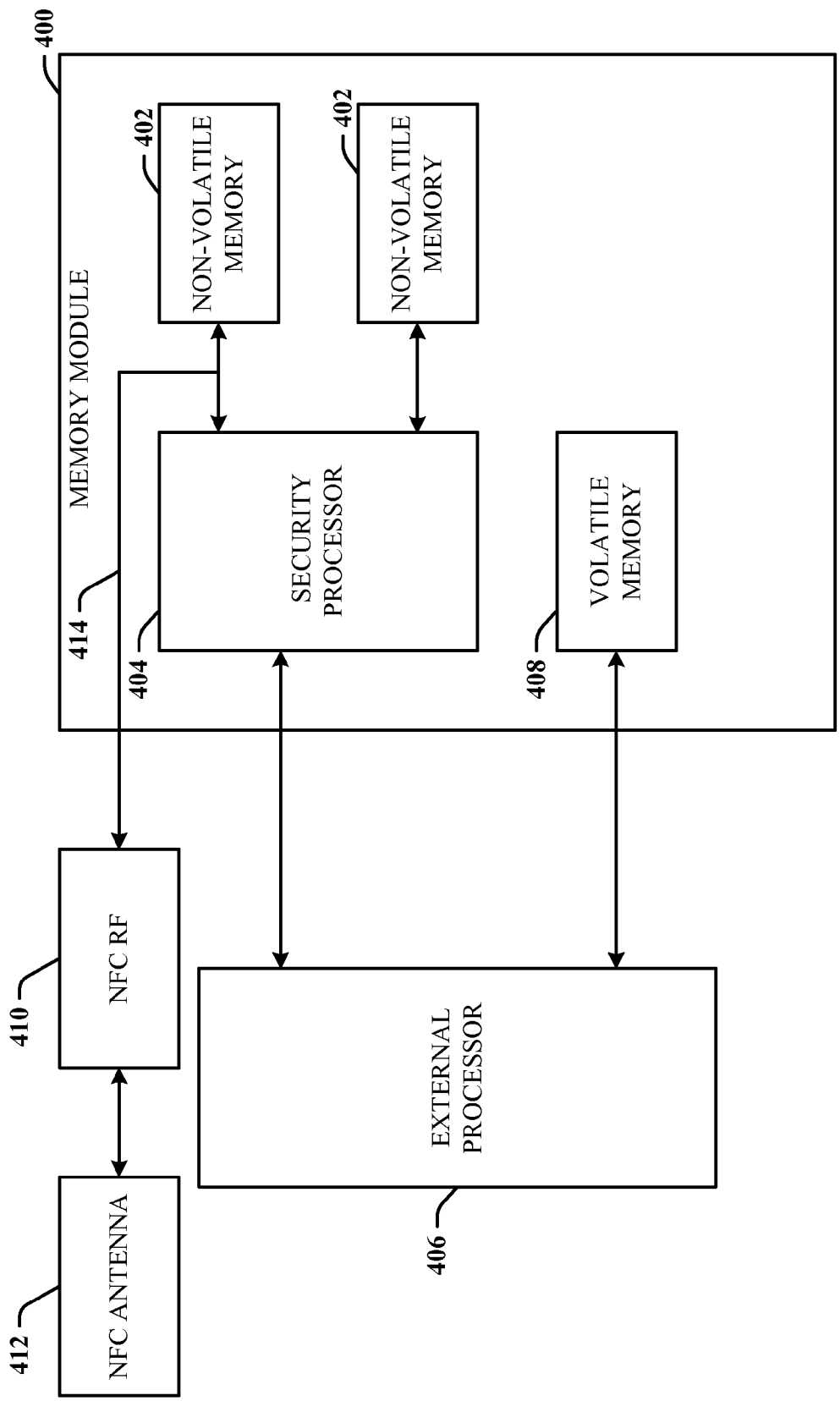
FIG. 4 illustrates a block diagram of the memory module wherein the NFC RF is a separate IC located outside of the memory module.

In another embodiment as illustrated in FIG. 4, an NFC RF 410 is a separate integrated circuit located outside of the memory module 400. The NFC RF 410 directly communicates with the security processor 404 and non-volatile memory 402 via a dedicated bus 414. The dedicated bus 414 allows NFC wireless protocol capabilities and security capabilities such as access controls and secure offloading (i.e., encryption on the fly, checking rights, authenticating a user, authenticating components within the system, channel encryption, etc.) to be executed within the secure execution environment of the memory module 400. Further, the NFC RF 410 directly interfaces to an NFC antenna 412 positioned outside of the memory module 400 to further enable wireless communication with the reader/external terminal.

The security processor 404 communicates with an external processor 406, such that the security processor 404 provides for concurrent processing of security protocols and NFC capabilities while the external processor 406 executes normal functions and WAN or LAN communications. Furthermore, the memory module 400 also includes volatile memory or RAM 408 used for the temporary data and code storage needs of the external processor 406.

Figure 5:
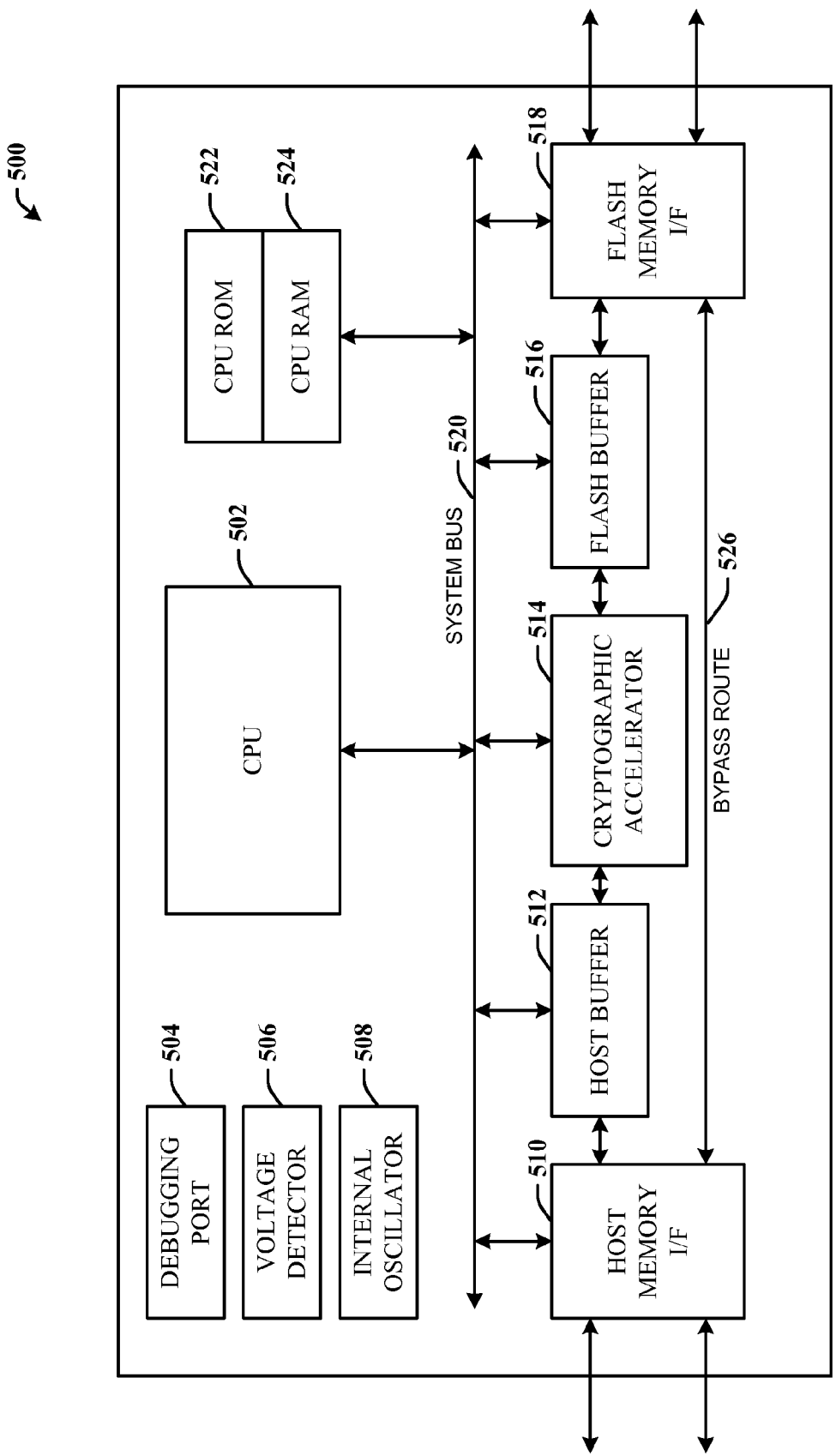
FIG. 5 illustrates a block diagram of a security processor of the memory module.

In more detail, FIG. 5 illustrates the components of a security processor 500. The security processor 500 includes a central processing unit (CPU) 502 or any other type of low power application processor. The CPU 502 within the security processor 500 can manage the flash memory storage (not shown) and provide a secure environment to implement authentication algorithms and security software. The security processor 500 also includes a Joint Test Action Group (JTAG) port 504 for debugging the system with a mechanism to prevent tampering, a voltage detector 506 that indicates the voltage level of the security processor 500 and stops the memory module from functioning when voltage levels are outside of the acceptable range in order to prevent side channel attacks, and an internal oscillator 508 that provides a clock for the security processor 500. This clock may be exported in its present form or may be divided to provide the clock signal for other components, such as a separate NFC RF chip or a fingerprint sensor. However, other mechanisms (not shown) can be provided that help prevent tampering. For example, temperature detecting, metal overlay (to hide signals), and scrambling of signals are additional methods that can be utilized in the security processor 500. A host memory interface (I/F) 510 handles all the flash memory transactions with a host processor and receives and transmits messages to the external processor or host processor (not shown). Specifically the host memory I/F 510 manages signaling, thus complying with the interface definitions of the flash memory. The host memory I/F 510 also manages interpretation or differentiating between a secure and non-secure request, and monitors requests to the flash to enforce access rights and permissions.

A host buffer 512 holds data for secured transactions to and from the host processor. The buffer 512 also serves as a mailbox between the CPU 502 and the host processor, wherein interpretation of the messages is carried out by the CPU 502. A cryptographic accelerator 514 that performs all the cryptographic algorithms, symmetric and a-symmetric needed by the system. The CPU 502 configures the cryptographic accelerator 514 and can control the data flow through the security processor 500. The CPU 502 interfaces a system bus 520 and the security applications that run on the CPU 502, arbitrating with the host processor. A flash buffer 516 holds data as it travels to and from the non-volatile memory or flash memory. The flash buffer 516 enables processing of a page while receiving the next page. A flash memory I/F 518 that handles all transactions to and from the flash memory storage and the security processor 500, such as signaling and interpretation.

A system bus 520 that allows the CPU 502 to communicate with the different components of the security processor 500. CPU ROM/RAM 522 and 524 contains code and data used by the CPU 502. The ROM 522 stores the CPU boot loader (not shown). Further, resident code and code overlays execute from the integrated CPU RAM 524, and are also used for the temporary data storage needs of the CPU 502. In operation, the host processor communicates with the security processor 500 and accesses the flash memory directly via a bypass route 526. Or, the host processor can communicate via the memory manager (not shown) running on the security processor 500 and access the flash memory through communications with the memory manager. In either case, access rights are enforced by the security processor 500 according to the security software embedded in the flash memory and the hardware design of the security processor.

Furthermore, the flash or non-volatile memory may be divided into multiple partitions of varying sizes and access rights. Secure partitioning is utilized to protect essential data and code, secure sensitive information, and allow easy access to common public data. Secure partitioning allows separate access controls to different partitions of data which could be made available based on user, service provider, original equipment manufacturer (OEM), enterprise authentication, or any other type of authentication available. The access controls distinguish between read and write (or erase) permissions and the descriptions of the owners who have the ability to change the access control. The NFC capabilities take advantage of the secure partitioning capabilities to enable independent third parties control of the secure memory within the mobile device terminal. This control allows the independent third parties to install keys and account details as needed per user/mobile device, and to provide payment history and tracking.

FIGS. 6-10 illustrate methodologies of integrating security functionality and NFC capabilities in a memory module according to various aspects of the innovation. While, for purposes of simplicity of explanation, the one or more methodologies shown herein (e.g. in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 6:
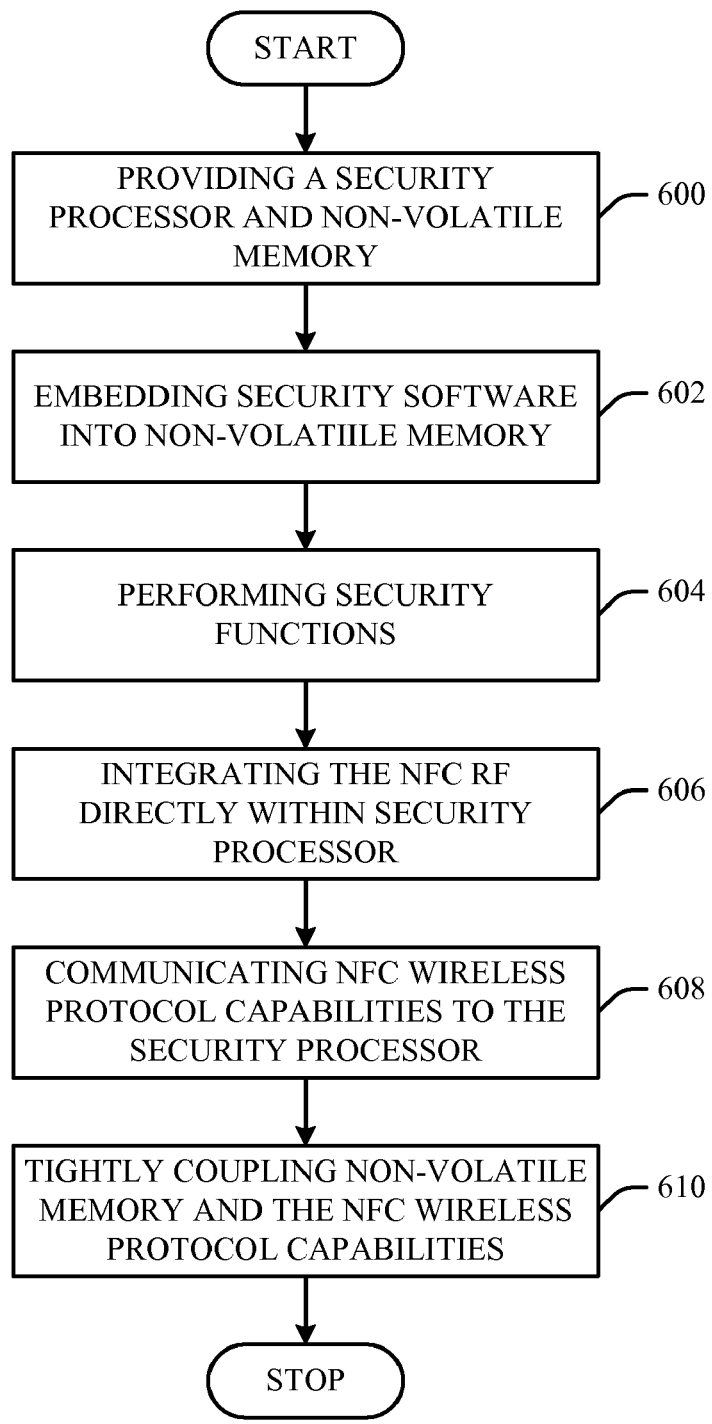
FIG. 6 illustrates a flow chart of a method of integrating security functionality and NFC capabilities in the memory module.

Referring to FIG. 6, a method of integrating security functionality and NFC capabilities in a memory module is illustrated. At 600, a security processor and non-volatile memory are provided within the memory module. The memory module is a package containing one or multiple chips of integrated circuits or semiconductors, wherein one integrated circuit houses the security processor and another integrated circuit houses the non-volatile memory. The integrated circuits are then coupled together to form the memory module. Optionally, the security processor and the non-volatile memory could be housed on one integrated circuit or piece of silicon. At 602, security software is embedded into the non-volatile memory. The security software includes access control software, password access control software, authentication software, shared key authentication software, PKI authentication software, integrity check software, encryption/decryption software, anti-virus software, anti-spyware software, etc. It is thus to be understood that any suitable security software and algorithms are contemplated and intended to fall under the scope of the hereto-appended claims.

At 604, security functions are performed via the embedded security software. And at 606, a NFC RF is integrated directly within the integrated circuit of the security processor. Integrating the NFC RF directly within the integrated circuit of the security processor allows NFC functionality within the secure environment of the memory module. Thus, NFC wireless protocol capabilities and security capabilities such as access controls and secure offloading (i.e., encryption on the fly, checking rights, authenticating a user, authenticating components within the system, channel encryption, etc.) are tightly coupled together and executed within the secure execution environment. Additionally, integration of the NFC RF within the security processor prevents the need to export sensitive data and keys from the trusted memory module. Further, integration of the NFC RF directly within the security processor also enables the secure non-volatile memory to directly interface to an NFC antenna positioned outside of the memory module to further enable wireless communication with the reader/external terminal.

Alternatively, the NFC RF, the security processor and the non-volatile memory can all be implemented on a single integrated circuit. This implementation on a single integrated circuit further reduces the threats from attackers to the trusted execution environment. Further, the NFC RF directly interfaces to an NFC antenna positioned outside of the memory module to further enable successful wireless communications with the reader/external terminal.

At 608, NFC wireless protocol capabilities are communicated to the security processor. As stated supra, the secure non-volatile memory directly interfaces with the NFC antenna via the security processor, which in turn communicates the NFC wireless protocol capabilities to the security processor for execution within the secure environment of the memory module. And at 610, the non-volatile memory and the NFC wireless protocol capabilities are tightly coupled to create a trusted, secure environment for the NFC wireless protocol capabilities. Accordingly, the security processor controls the entire non-volatile memory storage and the NFC RF, monitors all traffic to and from the non-volatile memory components, and enforces the access rights associated with the memory partitions. Further, the security processor provides for concurrent processing of security protocols and NFC capabilities while the external processor executes normal functions. Accordingly, both the security processor and the external processor coordinate read/write access to the non-volatile memory so as to optimize processor/memory utilization while ensuring a heightened level of security for the NFC technology.

Figure 7:
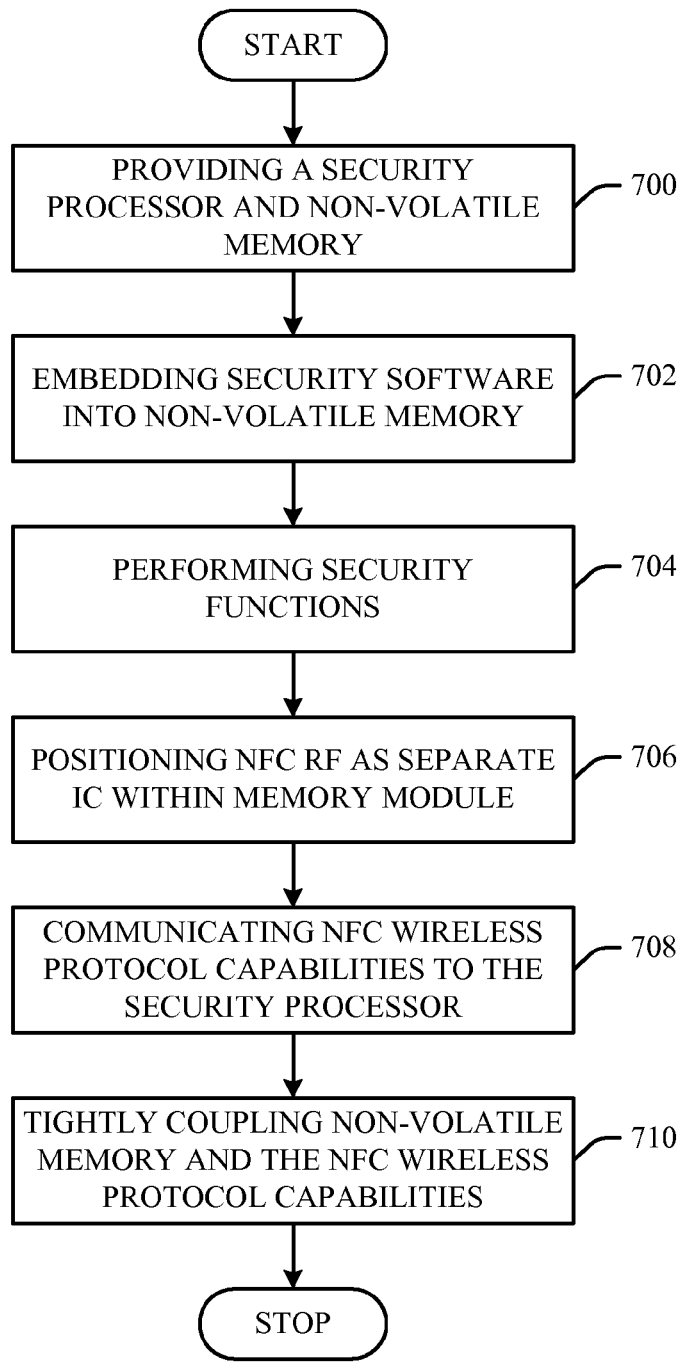
FIG. 7 illustrates a flow chart of a method of integrating security functionality and NFC capabilities in the memory module wherein the NFC RF is a separate IC located within the memory module.

Referring to FIG. 7, a method of integrating security functionality and NFC capabilities in a mobile device wherein the NFC RF is a separate integrated circuit located within the memory modules is illustrated. At 700, a security processor and non-volatile memory are provided within a memory module. At 702, security software is embedded into the non-volatile memory, such as, but not limited to password access control software, authentication software, shared key authentication software, PKI authentication software, integrity check software, encryption/decryption software, anti-virus software, and anti-spyware software.

At 704, security functions are performed via the embedded security software. And at 706, a NFC RF is positioned as a separate integrated circuit located within the memory module. Positioning the NFC RF within the memory module allows NFC functionality within the secure execution environment. As stated supra, NFC wireless protocol capabilities and security capabilities are executed within the secure execution environment of the memory module. Further, positioning of the NFC RF within the memory module also enables the secure non-volatile memory to directly communicate with the NFC RF chip via the security processor, which in turn directly interfaces to an NFC antenna positioned outside of the memory module to further enable wireless communication with the reader/external terminal.

At 708, NFC wireless protocol capabilities are communicated to the security processor. As stated supra, the secure non-volatile memory directly interfaces with the NFC antenna via the security processor, which in turn communicates the NFC wireless protocol capabilities to the security processor for execution within the secure environment of the memory module. And at 710, the non-volatile memory and the NFC wireless protocol capabilities are tightly coupled to create a trusted, secure environment for the NFC wireless protocol capabilities. Accordingly, both the security processor and the external processor coordinate read/write access to the non-volatile memory so as to optimize processor/memory utilization while ensuring a heightened level of security for the NFC technology.

Figure 8:
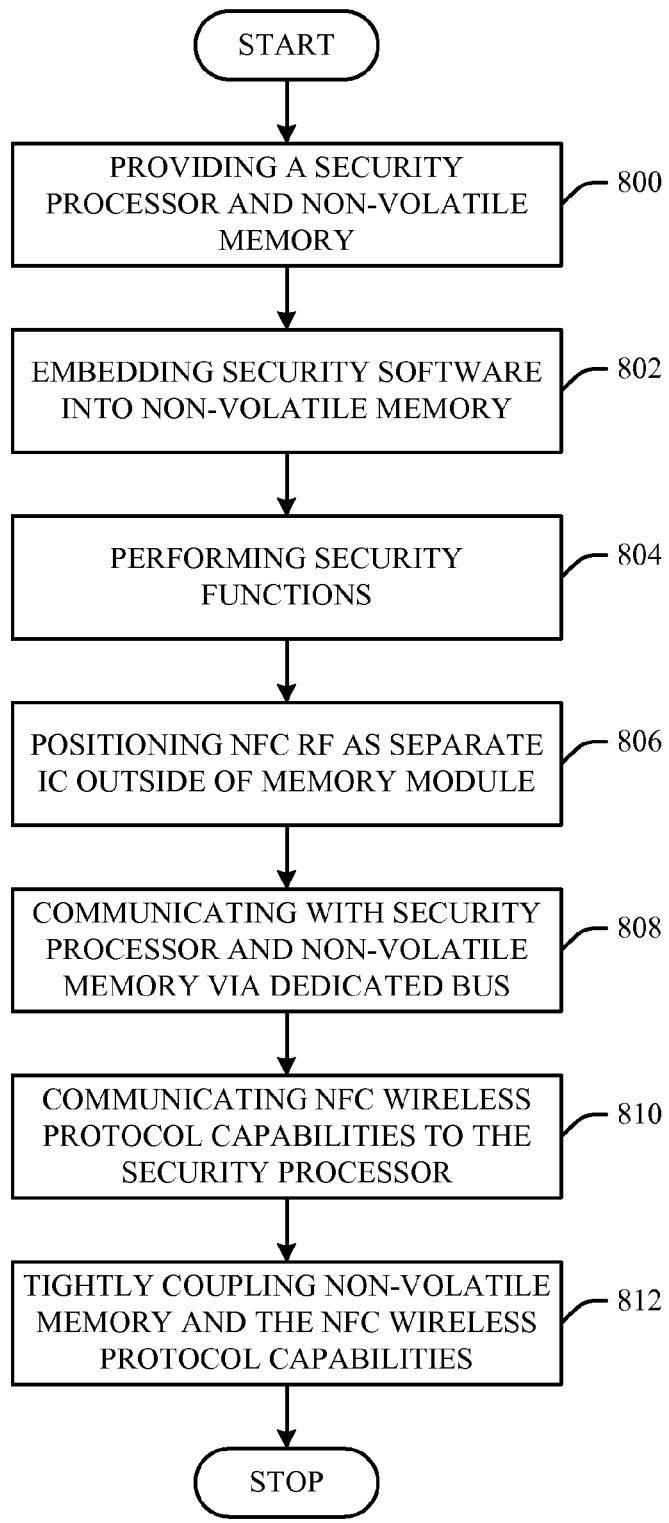
FIG. 8 illustrates a flow chart of a method of integrating security functionality and NFC capabilities in the memory module wherein the NFC RF is a separate IC located outside of the memory module.

Referring to FIG. 8, a method of integrating security functionality and NFC capabilities in a mobile device wherein the NFC RF is a separate integrated circuit located outside of the memory modules is illustrated. At 800, a security processor and non-volatile memory are provided within a memory module. At 802, security software is embedded into the non-volatile memory, such as, but not limited to password access control software, authentication software, shared key authentication software, PKI authentication software, integrity check software, encryption/decryption software, anti-virus software, and anti-spyware software.

At 804, security functions are performed via the embedded security software. And at 806, a NFC RF is positioned as a separate integrated circuit located outside of the memory module. At 808, the NFC RF directly communicates with the security processor and non-volatile memory via a dedicated bus. The dedicated bus allows NFC wireless protocol capabilities and security capabilities to be executed within the secure execution environment of the memory module. Further, the NFC RF directly interfaces to an NFC antenna positioned outside of the memory module to further enable wireless communication with the reader/external terminal.

At 810, NFC wireless protocol capabilities are communicated to the security processor. As stated supra, the NFC RF directly interfaces with the NFC antenna, which in turn communicates the NFC wireless protocol capabilities to the security processor for execution within the secure environment of the memory module. And at 812, the non-volatile memory and the NFC wireless protocol capabilities are tightly coupled to create a trusted, secure environment for the NFC wireless protocol capabilities. Accordingly, both the security processor and the external processor coordinate read/write access to the non-volatile memory so as to optimize processor/memory utilization while ensuring a heightened level of security for the NFC technology.

Figure 9:
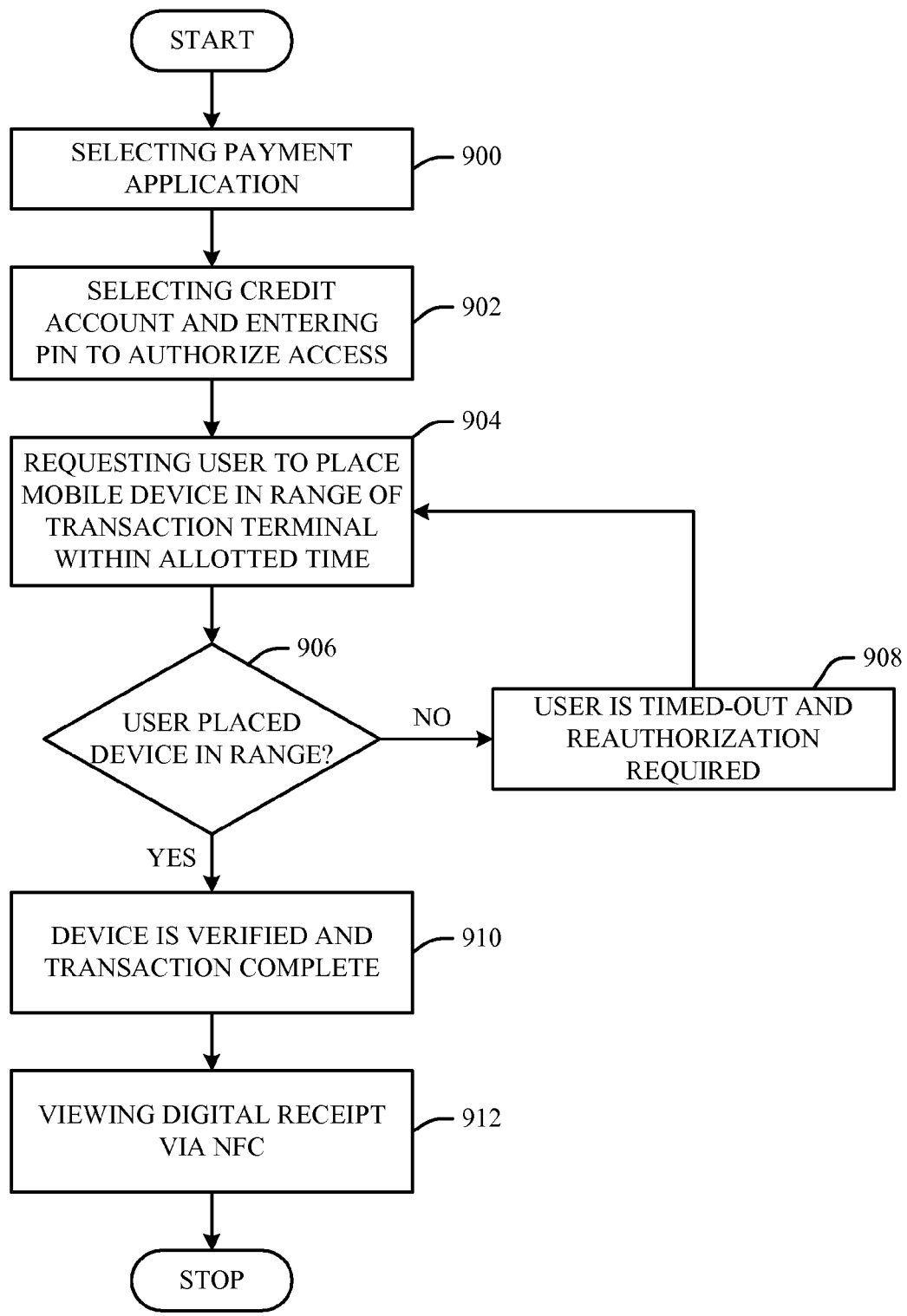
FIG. 9 illustrates a flow chart of a method of utilizing the NFC capabilities for mobile payment.

Referring to FIG. 9, a method of utilizing NFC capabilities for mobile payment is illustrated. At 900, a user selects the payment application on their mobile device to make a credit card purchase. The payment may be made from a credit account, a debit account, a pre-paid cash account, or any similar account. The details of each account would be stored inside the non-volatile memory, embedded in the mobile device. At 902, the user then selects the credit account to use and enters a personal identification number (PIN) to authorize access (alternatively biometric signal recognition can be used). For example, biometric data such as a fingerprint data, iris data and face data would control access to a user's account information. Accordingly, if fingerprint data were used, a fingerprint reader would be used to authenticate a user prior to transferring the account information. The security processor can directly support the fingerprint sensor component and also perform the sensitive activities of fingerprint registration and verification.

At 904, the PIN number is verified and the user has some amount of time (perhaps 5-10 seconds) to place the mobile device within the range of a transaction terminal before reauthorization is required. The security processor can use it's internal oscillator to track the elapsed time. The payment protocol is executed between an application stored in the mobile device and a physical point of sale (e.g. end terminal, remote server, another mobile device, etc.). At 906, it is determined whether the user placed the mobile device within the range of a transaction terminal within the allotted time period. At 908, if the user does not place the mobile device within the range of a transaction terminal within that amount of time, the user is timed out and reauthorization is required. At 910, if the user does place the mobile device within the range of a transaction terminal within the allotted time period the terminal verifies the device and the transaction is complete. However, large purchases (i.e., purchases over a set dollar amount), may require a user signature at the terminal for the transaction to be complete.

At 912, the user can view the digital receipt received via NFC on the mobile device or via short message system (SMS) to view transaction details. Possible transactions that are viable for NFC mobile payment include, but are not limited to, bus tickets, subway tickets, fast food restaurant purchases, convenience store purchases, downloads from smart posters, media downloads from kiosks, parking meter payments, grocery store purchases, drug store purchases, gas station purchases, movie theater tickets, restaurant purchases, sports event tickets and department store purchases.

The secure execution environment of the memory module facilitates integrated security capabilities and NFC functionality. Further, the memory module provides for authentication services and secure channel communications. The authentication services and/or secure channel communications of the memory module are used in a variety of NFC applications to enforce the security policies of the device, data or application.

Authentication services utilized by the memory module include password authentication, shared key authentication and PKI authentication. These authentication services are used in association with three types of authentication. Type 1 is authenticating a user to the secure non-volatile memory, type 2 is authenticating an external component (e.g., processor) to the secure non-volatile memory and type 3 is authenticating a server to the secure non-volatile memory.

Further, in addition to authentication applications, the memory module also provides for secure channel communications. Specifically, the memory module provides for two types of secure channel communications used in association with the authentication services. Type 1 establishes a secure channel of communication from an external component to the non-volatile memory, security processor, or NFC RF and type 2 establishes a secure channel of communication from a back end server to the non-volatile memory, security processor, or NFC RF.

Figure 10:
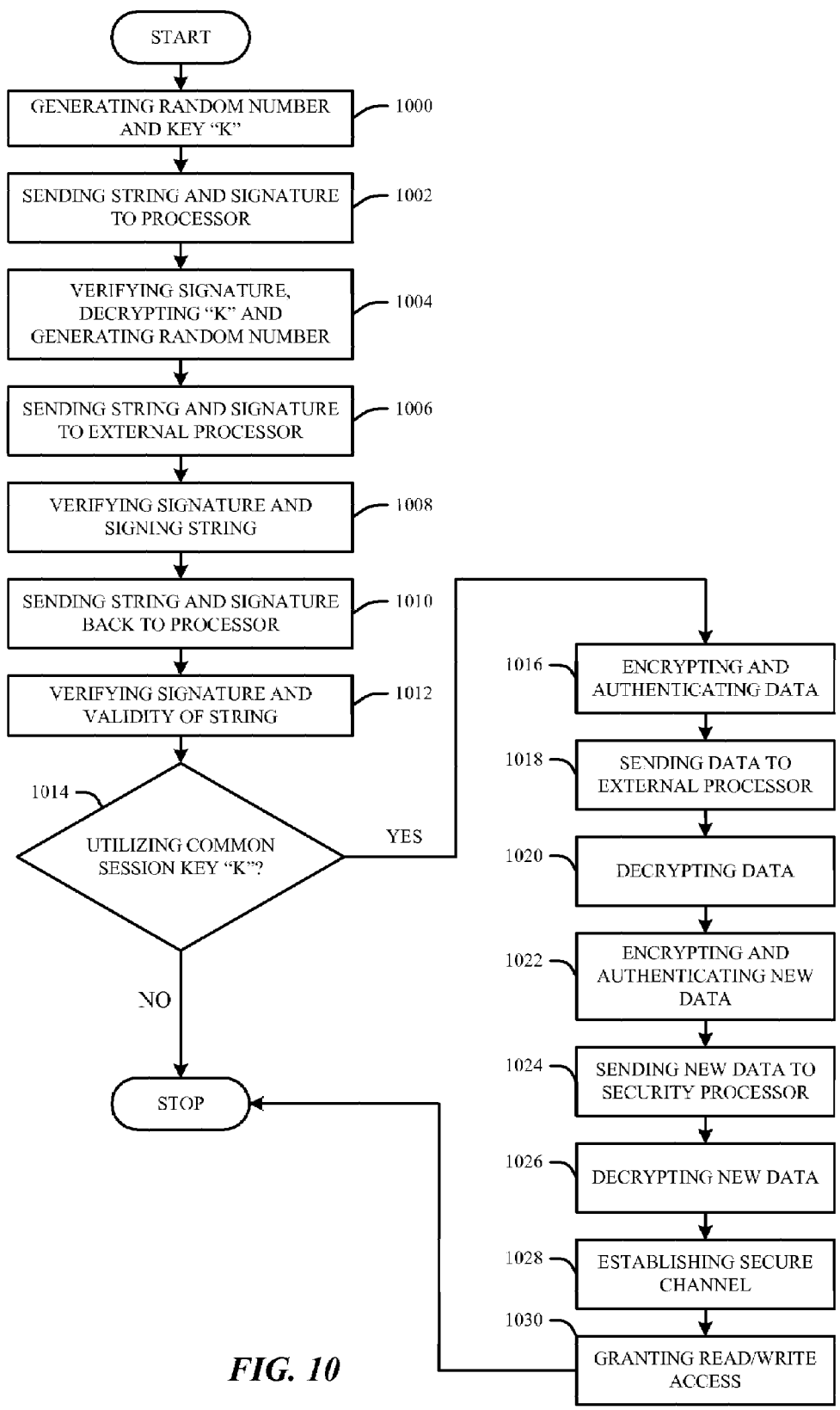
FIG. 10 illustrates a flow chart of a method of authenticating an external processor to the secure non-volatile memory.

For example, FIG. 10 illustrates a method for authenticating an external processor to the secure non-volatile memory (Type 2 Authentication). At 1000, the external processor generates a random number and symmetric key "K", the external processor encrypts "K" under the security processor's public key and signs the whole string under the external processor's own private key. At 1002, the external processor sends the string and signature to the security processor. At 1004, the security processor verifies the signature and checks the string's ID, decrypts "K" and generates a random number and signs the whole string. At 1006, the security processor sends the string and signature to the external processor. At 1008, the external processor verifies the signature and checks the random number string and ID and signs the string. At 1010, the external processor sends the string and signature back to the security processor. At 1012, the security processor verifies the signature and checks the validity of the string. At 1014, both the security processor and external processor utilize the generated, common session key "K" if secure channel communications are needed.

After authentication, a secure channel can then be established between the external processor and the non-volatile memory (Type 1 Secure Channel). After authentication, at 1016, the generated session key "K" is utilized and the security processor encrypts and authenticates data with the session key "K". At 1018, the security processor then sends the data to the external processor. At 1020, the external processor decrypts the data with the session key "K" and checks for integrity. At 1022, the external processor processes the information and encrypts and authenticates new data with the session key "K". At 1024, the external processor then sends the new data to the security processor. And, at 1026, the security processor decrypts the new data with the session key "K" and checks the integrity of the data. Once the integrity is verified, at 1028 a secure channel is derived by using the session key "K" for exchanging data between the external processor and the security processor. The encryption with authentication provides the necessary security. Once the secure channel is established, at 1030 read/write access is granted to the external processor and malicious software/agents are prevented from read and/or write access.

Figure 11:
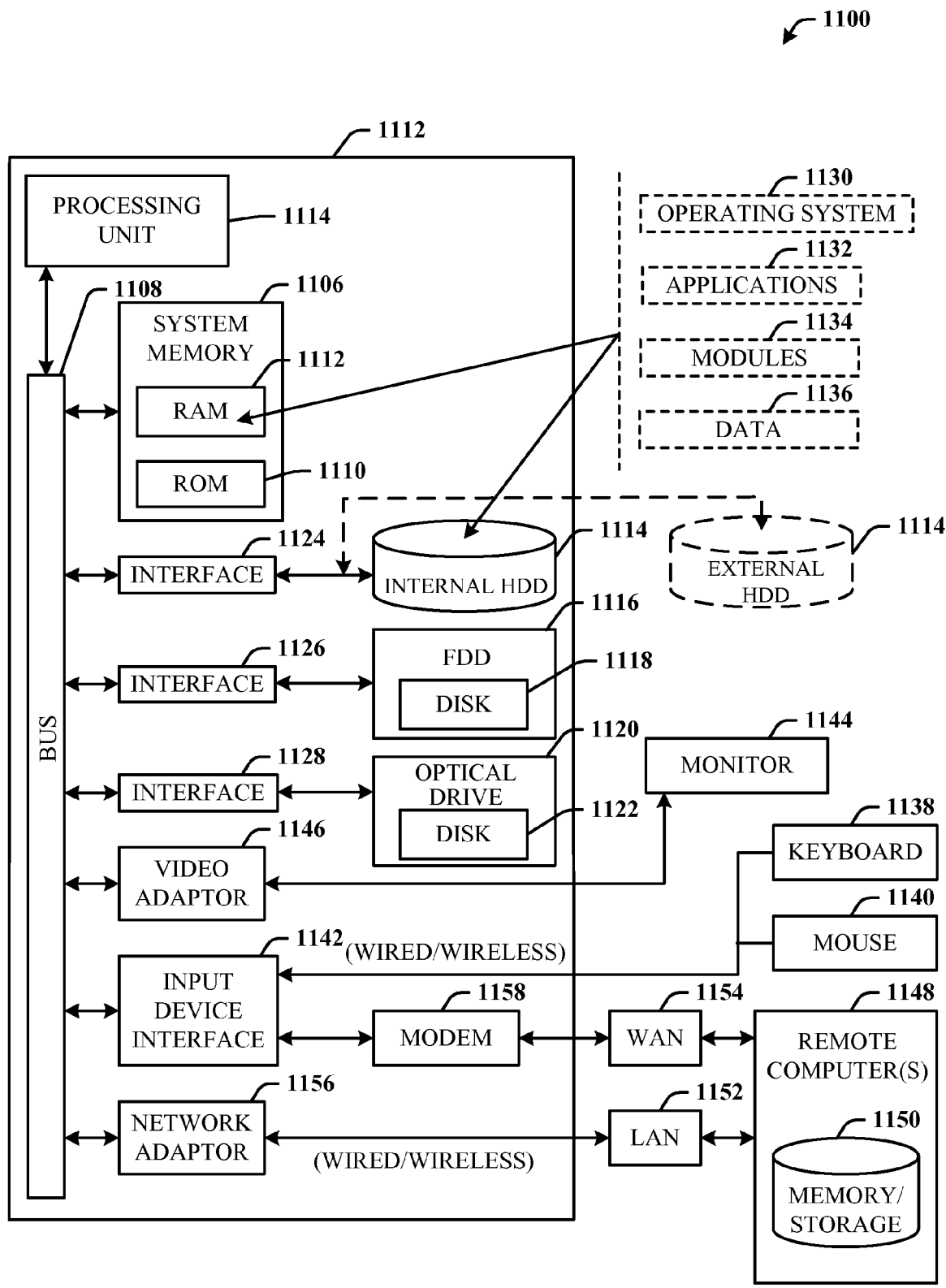
FIG. 11 illustrates a block diagram of a computer operable to execute the disclosed integrated memory module architecture.

Referring now to FIG. 11, there is illustrated a block diagram of a computer operable to execute the disclosed integrated memory module architecture. In order to provide additional context for various aspects thereof, FIG. 11 and the following discussion are intended to provide a brief, general description of a suitable computing environment 1100 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1102 through one or more wired/wireless input devices (e.g., a keyboard 1138 and a pointing device, such as a mouse 1140). Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks (e.g., a wide area network (WAN) 1154). Such LAN and WAN networking environments are commonplace in offices and companies, and facilitate enterprise-wide computer networks, such as intranets, all of which may connect to a global communications network (e.g., the Internet).

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices (e.g., computers) to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
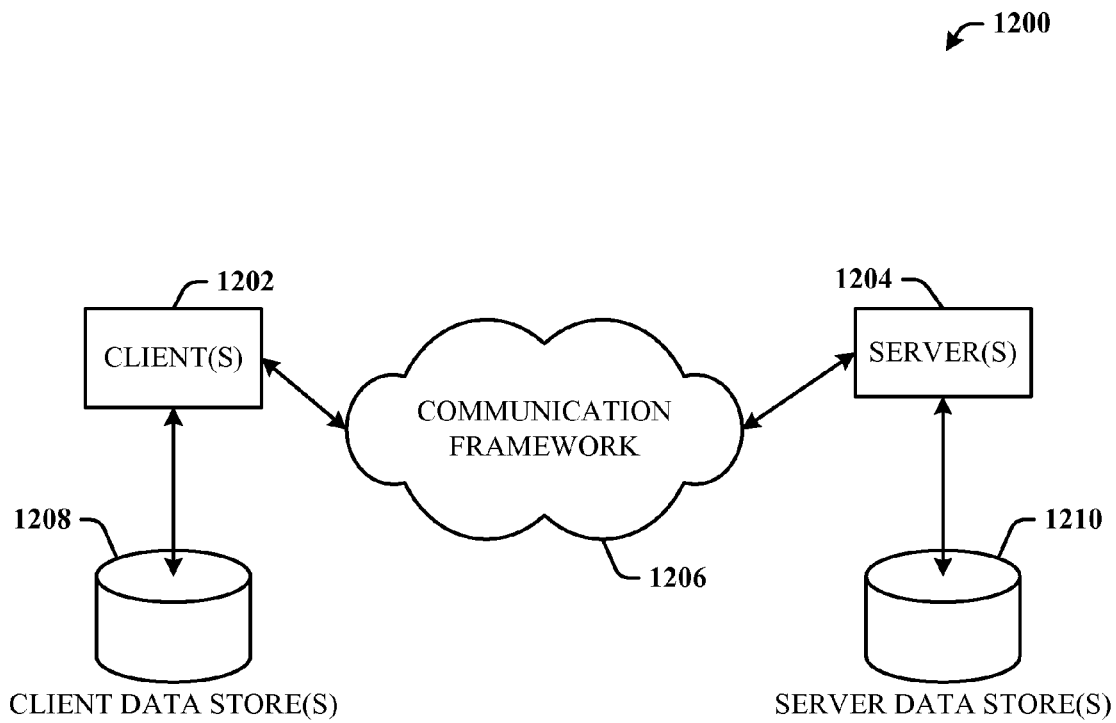
FIG. 12 illustrates a schematic block diagram of an exemplary computing environment for use with the integrated memory module.

Referring now to FIG. 12, there is illustrated a schematic block diagram of an exemplary computing environment 1200 in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the subject innovation, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g. cookie(s) and/or associated contextual information). Similarly, the server(s) 1204 are operatively connected to one or more server data store(s) 1210 that can be employed to store information local to the servers 1204.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A memory module, comprising:
a non-volatile memory that stores security software, sensitive data, and keys;
a security processor that accesses the security software from the non-volatile memory and performs security functions based on the stored security software;
an external processor that concurrently processes non-security functions, allowing the security processor to process security functions without the external processor executing interrupts to process security functions; and
a near field communications (NFC) radio frequency transmitter and receiver (RF) that couples NFC wireless protocol capabilities to security functionalities of the security processor, wherein the memory module directly couples to an NFC antenna located outside of the memory module via a dedicated bus, wherein the dedicated bus provides a secure execution environment for the NFC wireless protocol capabilities and the security functions to be executed, and wherein the NFC RF is directly integrated into the security processor, interfacing the non-volatile memory directly to the NFC antenna and communicates with an external terminal via the NFC antenna to transmit information related to the NFC wireless protocol capabilities.

2. The memory module of claim 1, wherein the NFC RF is a separate integrated circuit (IC) located within the memory module such that the non-volatile memory directly communicates with the NFC RF chip.

3. The memory module of claim 1, wherein the NFC RF, the security processor and the non-volatile memory are directly integrated into a single IC within the memory module.

4. The memory module of claim 1, wherein the NFC RF is a separate IC located outside of the memory module such that the non-volatile memory can directly communicate through the security processor, with the NFC RF chip.

5. The memory module of claim 4, wherein a dedicated bus is located between the NFC RF and the security processor to establish an interface for direct communications, the interface is an encrypted channel for secure communications.

6. The memory module of claim 1, further comprising volatile memory used for the temporary data and code storage needs of an external processor.

7. The memory module of claim 6, wherein the external processor is located outside of the memory module and arbitrates with the security processor for access to the non-volatile memory, and wherein the security processor sits in series between the external processor and the non-volatile memory.

8. The memory module of claim 7, further comprising a communication channel between the external processor and the security processor, the communication channel is a NOR, NAND or shared NOR/NAND bus interface.

9. The memory module of claim 1, wherein the non-volatile memory is flash memory.

10. The memory module of claim 9, wherein the flash memory is NOR and NAND flash memory.

11. The memory module of claim 9, wherein the flash memory is divided into multiple partitions of varying sizes and access rights, and wherein access rights are assigned to the partitions based on security requirements established for each partition.

12. The memory module of claim 1, wherein the security software comprises at least one of password access control software, authentication software, shared key authentication software, public key infrastructure (PKI) authentication software, integrity check software, encryption/decryption software, anti-virus software and anti-spyware software.

13. The memory module of claim 1, wherein the mobile device comprises one of a multimedia player, a Personal Digital Assistant (PDA), a cellular phone, and a hand held computing device.

14. A method comprising:
providing a dedicated security processor and a non-volatile memory within a memory module;
embedding security functionality directly into the non-volatile memory;
processing non-security functions via an external processor;
performing security functions related to the embedded security functionality via the security processor;
providing a near field communications (NFC) radio frequency transmitter and receiver (NRC RF) directly integrated into the security processor such that the non-volatile memory directly interfaces to an NFC antenna located outside the memory module, wherein the memory module is directly coupled to the NFC antenna via a dedicated bus, and wherein the NFC RF communicates with an external terminal via the NFC antenna to transmit information related to NFC wireless protocol capabilities;
executing the security functions and the NFC wireless protocol capabilities in a secure execution environment provided by the dedicated bus;
communicating other information related to the NFC wireless protocol capabilities to the security processor via the NFC antenna; and
at least one of:
authenticating access rights associated with access to the non-volatile memory via the NFC RF; or
establishing a secure channel of communications between the external terminal and the non-volatile memory via the NFC RF.

15. The method of claim 14, further comprising:
utilizing the NFC wireless protocol capabilities for receiving, via a mobile device, a payment related to a purchase;
receiving a selection of an account and entry of a personal identification number (PIN), wherein details of the account are stored in the non-volatile memory;
verifying the PIN number;
determining whether the mobile device is within a range of a transaction terminal within a predetermined amount of time of the verifying the PIN number;
completing the payment based on the determining whether the mobile device is within the range; and
viewing a digital receipt received via the NFC based on the completing the payment.

16. The method of claim 14, further comprising positioning the NFC RF as a separate integrated circuit (IC) located within the memory module such that the non-volatile memory directly communicates with the NFC RF chip via the security processor.

17. The method of claim 14, further comprising positioning the NFC RF as a separate IC located outside of the memory module such that the non-volatile memory directly communicates with the NFC RF chip via the security processor.

18. A non-transitory computer readable medium having stored thereon instructions that cause a computer to perform a process, the process comprising:
utilizing a dedicated security processor and a flash memory within a memory module to perform security functions;
utilizing an external processor to perform non-security functions, wherein the external processor allows the dedicated security processor to perform security functions without the external processor executing interrupts to process security functions;
accessing security functionality embedded directly into the flash memory;
processing security protocols via the embedded security functionality;
interfacing a near field communications (NFC) radio frequency transmitter and receiver (NFC RF) that is directly integrated into the security processor, such that non-flash memory in the memory module interfaces directly to an NFC antenna via a dedicated bus that enables a secure execution environment, and wherein the NFC RF communicates with an external terminal via the NFC antenna to transmit information associated with NFC wireless protocol capabilities;
communicating information related to the NFC wireless protocol capabilities to the security processor; and
at least one of:
authenticating access rights associated with access to the non-volatile memory via the NFC RF; or
establishing a secure channel of communications between the external terminal and the non-volatile memory via the NFC RF.

* * * * *